United States Patent
Waltinger

(10) Patent No.: US 10,095,727 B2
(45) Date of Patent: Oct. 9, 2018

(54) DATA UNIFICATION DEVICE AND METHOD FOR UNIFYING UNSTRUCTURED DATA OBJECTS AND STRUCTURED DATA OBJECTS INTO UNIFIED SEMANTIC OBJECTS

(71) Applicant: SIEMENS AKTIENGESELLSCHAFT, München (DE)

(72) Inventor: Ulli Waltinger, Neuburg (DE)

(73) Assignee: Siemens Aktiengesellschaft, München (DE)

( * ) Notice: Subject to any disclaimer, the term of this patent is extended or adjusted under 35 U.S.C. 154(b) by 373 days.

(21) Appl. No.: 14/785,897

(22) PCT Filed: Feb. 27, 2014

(86) PCT No.: PCT/EP2014/053865
§ 371 (c)(1),
(2) Date: Oct. 21, 2015

(87) PCT Pub. No.: WO2014/177302
PCT Pub. Date: Nov. 6, 2014

(65) Prior Publication Data
US 2016/0098441 A1    Apr. 7, 2016

Related U.S. Application Data

(60) Provisional application No. 61/817,286, filed on Apr. 29, 2013.

(51) Int. Cl.
*G06F 17/30* (2006.01)
*G06N 5/02* (2006.01)
*G06N 7/00* (2006.01)

(52) U.S. Cl.
CPC .. *G06F 17/30371* (2013.01); *G06F 17/30654* (2013.01); *G06N 5/027* (2013.01); *G06N 7/005* (2013.01)

(58) Field of Classification Search
None
See application file for complete search history.

(56) References Cited

U.S. PATENT DOCUMENTS 8,250,026 B2 *  8/2012  Mok .................. G06F 17/30554
                                                 707/602
8,290,951 B1 * 10/2012  Joa .................... G06F 17/30557
                                                 707/736

(Continued)

OTHER PUBLICATIONS

Fillmore C. J. et al., "A Frames Approach to Semantic Analysis," The Oxford Handbook of Linguistic Analysis, pp. 313-340, 2009.

(Continued)

*Primary Examiner* — Hung Le
(74) *Attorney, Agent, or Firm* — Lempia Summerfield Katz LLC

(57) ABSTRACT

A data unification device for unifying data objects includes a retrieving entity, a first providing entity, a second providing entity, and an assembling entity. The retrieving entity is configured to retrieve unstructured data objects from a number of unstructured knowledge bases and structured data objects from a number of structured knowledge bases. The first providing entity is configured to provide a number of syntactic frames for each retrieved data object, wherein each syntactic frame include a syntactic concept, a syntactic concept-instance, and a syntactic concept-instance relationship. The second providing entity is configured to provide a number of semantic frames for each retrieved data object, wherein each semantic frame includes a semantic concept, a semantic concept-instance, and a semantic concept-instance relationship. The assembling entity is configured to (Continued)

assemble, for each retrieved data object, the provided syntactic frames and the provided semantic frames to one semantic object.

15 Claims, 5 Drawing Sheets

(56) References Cited

U.S. PATENT DOCUMENTS

| | | | | |
|---|---|---|---|---|
| 9,037,615 | B2* | 5/2015 | Bornea | G06F 17/30292 707/803 |
| 2003/0033275 | A1* | 2/2003 | Alpha | G06F 17/30321 |
| 2005/0108256 | A1* | 5/2005 | Wakefield | G06F 17/30569 |
| 2007/0203693 | A1 | 8/2007 | Estes | |
| 2007/0282659 | A1* | 12/2007 | Bailey | G06Q 10/06 705/7.21 |
| 2008/0114724 | A1* | 5/2008 | Indeck | G06F 17/30595 |
| 2010/0228721 | A1* | 9/2010 | Mok | G06F 17/30554 707/711 |
| 2010/0228794 | A1* | 9/2010 | Roy | G06F 17/30613 707/809 |
| 2012/0117120 | A1* | 5/2012 | Jacobson | G06F 17/30557 707/793 |
| 2013/0332478 | A1* | 12/2013 | Bornea | G06F 17/30946 707/763 |
| 2014/0039968 | A1* | 2/2014 | Said | G06Q 10/06 705/7.26 |

OTHER PUBLICATIONS

Gregory M. et al., "Domain Independent Knowledge Base Population From Structured and Unstructured Data Sources," 24th Florida Artificial Intelligence Research Society conference FLAIRS2011, pp. 251-256, 2011.

PCT International Search Report and Written Opinion of the International Searching Authority dated Oct. 9, 2014 for corresponding PCT/EP2014/053865.

Shen Wei et al., "LINDEN: Linking Named Entities with Knowledge Base via Semanitc Knowledge," Proceedings of the 21st International Conference on World Wide Web, WWW'12, pp. 449-458, 2012.

Weikum G. et al., "From Information to Knowledge: Harvesting Entities and Relationships from Web Sources," Proceedings of the Twenty-Ninth ACM Sigmod-Sigact-Sigart Symposium on Principles of Database Systems of Data, PODS´,10, New York, 2010.

* cited by examiner

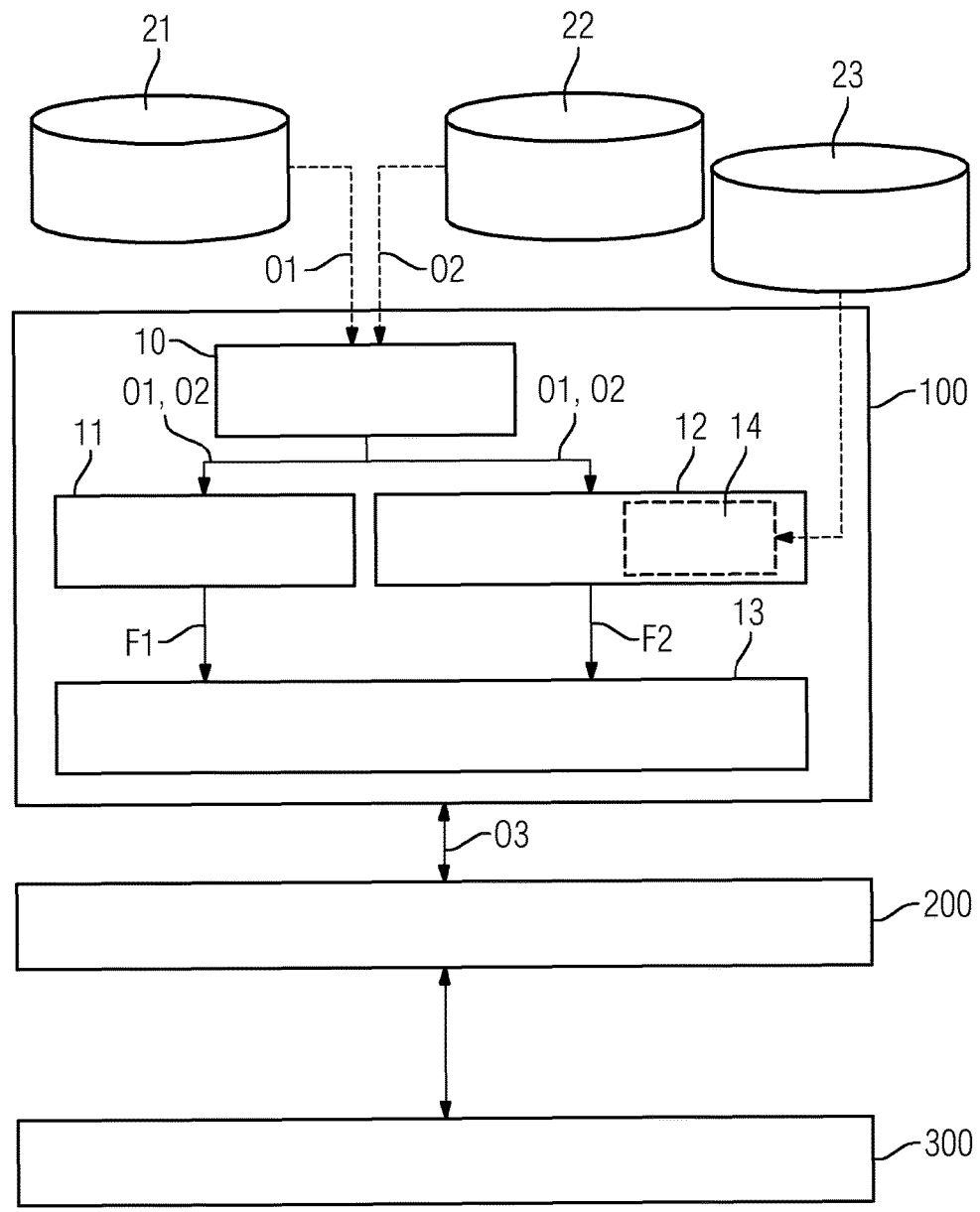

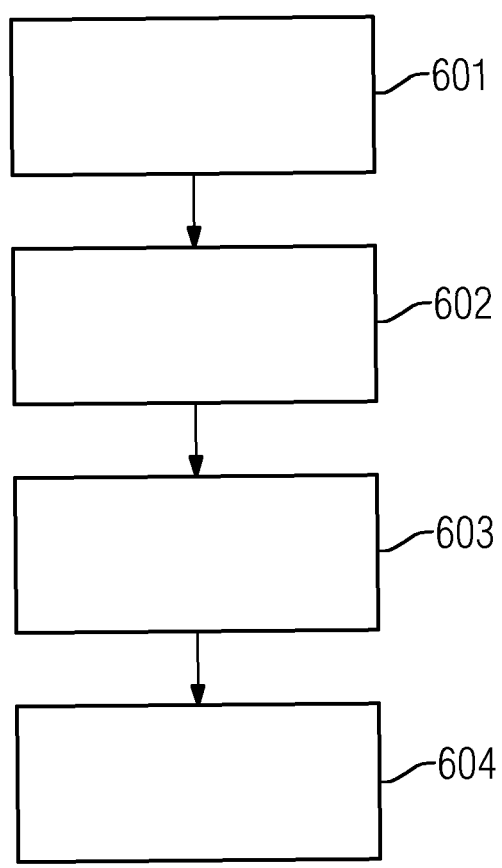

DATA UNIFICATION DEVICE AND METHOD FOR UNIFYING UNSTRUCTURED DATA OBJECTS AND STRUCTURED DATA OBJECTS INTO UNIFIED SEMANTIC OBJECTS The present patent document is a § 371 nationalization of PCT Application Serial Number PCT/EP2014/053865, filed Feb. 27, 2014, designating the United States, which is hereby incorporated by reference, and this patent document also claims the benefit of U.S. Provisional Patent Application No. 61/817,286, filed on Apr. 29, 2013, which is also hereby incorporated by reference.

TECHNICAL FIELD

The present embodiments relate to a data unification device and to a method for unifying unstructured data objects and structured data objects into unified semantic objects.

BACKGROUND

Today's enterprises make decisions based on analyzing information from massive and heterogeneous databases or sources. More and more aspects of controlling machines or technical installations are driven by data, and as a result more and more operators need access to data.

The challenges of building an industrial grade question-answering (QA) system are many fold, not only due of the domain specificity of the underlying knowledge bases, but also because of the user interaction with the system, which needs to cover a wide range of queries.

The most pressing challenge is run time performance on commodity hardware. For example, an acceptable speed may be defined as computing the answer representation within 800 ms.

The system may be scalable, in that the response time may not be proportional to the size of data being accessed.

Often, enterprise data is heterogeneous and dynamic and thus unstructured. For example, a QA system needs to integrate these sources and accommodate their changing nature. Part of the integration process may include offering unified semantics for the data.

For example, it is estimated that up to 80% of all information is unstructured data. That means, in general, the data to be searched include unstructured data as well as structured data.

For example, for searching unstructured data and structured data, a so-called common index structure may be used. That is, the unification process of (e.g., primarily) unstructured data is accomplished by using the traditional approach of an inverted term index that is built separately for each data source.

More precisely, any given data object (e.g., document) is represented by splitting the document into its corresponding term features, (e.g., single words), and assigning some feature weighting method to the respective feature value, as for example the occurrence (e.g., word frequency, inverse document frequency) within the document and the entire document collection.

For retrieval purposes, any given query is mapped onto the inverted (e.g., single) word index and the resultant document references, (e.g., document identifier), are merged and ranked by a given ranking measurement, (e.g., cosine similarity or page-rank algorithm). With reference to structured data, the retrieval process is in the same way being integrated.

An actual unification process, however, between unstructured and structured data repositories or knowledge bases is not conducted. That is, the different repositories use their separate index structures. Moreover, computation, weighting or ranking, between and overarching, are left out of the actual basic unification process. That is, this process unifies the data by separate index structures focusing on the traditional (e.g., inverted) term index structure.

Accordingly, it is an object to improve unifying unstructured data objects and structured data objects.

SUMMARY AND DESCRIPTION

The scope of the present invention is defined solely by the appended claims and is not affected to any degree by the statements within this summary. The present embodiments may obviate one or more of the drawbacks or limitations in the related art.

According to a first aspect, a data unification device for unifying unstructured data objects and structured data objects into unified semantic objects is proposed. The data unification device includes a retrieving entity, a first providing entity, a second providing entity, and an assembling entity. The retrieving entity is configured to retrieve unstructured data objects from a number of unstructured knowledge bases and structured data objects from a number of structured knowledge bases. The first providing entity is configured to provide a number of syntactic frames for each retrieved data object, wherein each of the syntactic frames includes a syntactic concept, a syntactic concept-instance, and a syntactic concept-instance relationship. The second providing entity is configured to provide a number of semantic frames for each retrieved data object, wherein each of the semantic frames includes a semantic concept, a semantic concept-instance, and a semantic concept-instance relationship. Further, the assembling entity is configured to assemble, for each retrieved data object, the provided syntactic frames and the provided semantic frames to one semantic object.

The present data unification device provides an automatic mechanism for an effective information identification of structured and unstructured data objects that builds the basis for applying semantic analysis methods and algorithms, (e.g., multifaceted data queries, question-answering, or semantic search), on top of a unification layer that may offer unified semantics for data. In particular, the present data identification device may support domain experts and/or other software components, like a natural language question-answering device, in the process of specifying and fine-tuning initial search requests by allowing accessing a unified data representation, here the unified data objects that are aggregated from unstructured and structured data bases, e.g., heterogeneous and distributed data sources and repositories.

In particular, the present data unification device focuses specifically on unified access to large bodies of unstructured and structured data. The present data unification device may merge both worlds, namely structured and unstructured data, and may utilize an overall integration process that includes the syntactic and semantic information of the comprised data. In particular, the present data unification device may follow the line of the cognitive frames (see, e.g., Minski, 1975) and its slot-filler representation approach, e.g., extracting syntax- and semantic-driven information out of a knowledge base representation. Moreover, the data unification device may enable users to turn massive amounts of structured and unstructured service data, like distributed and stored in various data bases and full-text indices, into accessible and actionable knowledge, here the unified semantic objects, by the data unification.

A principle of the present unification process for unified data access is the conversion of both unstructured and structured data items (e.g., document or data base-oriented key-value pairs) into semantic objects. That is, given an input document called data object, the present data unification device targets to identify the syntactic properties, called syntactic frames, (e.g., relational-syntax-based, and/or data repository reference information) and the semantic information called semantic frames, as inducing the actual meaning with reference to a given knowledge representation, (e.g., Germany is-a country). Both properties are subsequently merged into the representation of a semantic object.

As a result, any input data object, namely each of the unstructured data objects and the structured data objects, is converted by the present data unification device into a list of semantic objects that traces the referenced/linked initial representation or data source. Here, the present data unification device follows the line of a triplification process (e.g., trichotomy) of concept, concept-instance and concept-instance relationship, wherein individual terms and/or phrases are interlinked to different concepts and relationships. This representation strategy is applied to both, structured and unstructured data objects, and builds thereby the base for the present unified data access.

According to an embodiment, the first providing entity, the second providing entity, and the assembling entity are configured to virtualize the unstructured data objects and the structured data objects by the assembled semantic objects.

By virtualizing the unstructured data objects and the structured data objects, the data as such stays where it is, namely in the corresponding knowledge base. Here, only metadata is generated.

According to a further embodiment, the retrieving entity is embodied as a dispatcher configured to access different unstructured and structured knowledge bases.

By the present dispatcher, all new knowledge bases or data sources and repositories may be added. The dispatcher may build the basis of the repository integration phase. All other entities or components request the information needed against the dispatcher. The dispatcher may also be embodied as a raw data retrieval layer.

According to a further embodiment, the retrieving entity (e.g., dispatcher) is configured to parse, to request, to query and/or to download data objects from the different unstructured and structured knowledge bases.

According to a further embodiment, the first providing entity and the second providing entity are arranged in parallel between the retrieving entity and the assembling entity.

According to a further embodiment, the providing entity is configured to extract linguistic-based information from each of the retrieved data objects by applying at least one of the following pre-processing algorithms: document structure detection, sentence boundary detection, tokenization, named entity recognition, linguistic parsing, data sourcing and routing and language detection.

For example, the document structure detection may identify the document structure of the data object by an XML-based mark-up, (e.g., pages, divisions, sections and headers). Further, sentence boundary detection may identify the individual sentences within a document. The tokenization may split a document or an expression into its respective tokens. The named entity recognition may recognize the mentioned entities within the document, (e.g., time, date, person, location, and company). The linguistic parsing, (e.g., a dependency parser), may detect grammar dependencies in the data object, (e.g., subject, word, object, or dependency relationships). The data source routing may trace the initial data source or repository the data object (e.g., document) belongs to. The language detection may detect included language sections within a data object.

The present first providing entity may thus tackle the task of frame extraction for a given data object. On the basis of a respective surface form, (e.g., single value, entire document), the first providing entity may extract individual syntactic frames, (e.g., single pages, paragraphs, sentences, phrases, multi-words and/or tokens), and associates it with the respective knowledge base, repository and/or single entities. Particularly, any given data object may include a single or a list of syntactic frames.

According to a further embodiment, the first providing entity is configured to extract single pages, paragraphs, sentences, phrases, multi-words, and/or tokens from each of the retrieved data objects into a syntactic frame.

According to a further embodiment, the second providing entity is configured to identify semantic information from each of the retrieved data objects by applying at least one of the following algorithms: knowledge base concept references, semantic concept references, syntax relationship references and degree of probability.

The knowledge base concept references may interlink the data frame (e.g., as a data object with syntactic frame assigned) with initial concept references that are already present in the source data source or repository (e.g., data base-based column relationship such as Temperature—has-Value—90 degree). The semantic concept references may assign relationships that connect a lexical surface form with a semantic network graph (e.g., 'Paris' '<http://dbpedia.org/ontology/city>' '<http://dbpedia.org/page/Paris>'). The syntax relationship references may typify the relationship between an identified object and its associated syntactic frame (e.g., 'Paris'—hasContext—'Paris was founded around the end of the 3rd century BC by the Gauls.', DocumentX—hasParseTreeRepresentation—TreeX). The degree of probability may calculate the probability of concept and/or semantic references (e.g., 'Paris' is-a 'City'—0.9; 'Paris' is-a 'Name'—0.1) on the basis of the entire list of semantic frames using a (pre-) defined probability measurement (e.g., maximum likelihood).

According to a further embodiment, the second providing entity is configured to identify unique resource identifiers and relationship references from each of the retrieved data objects.

According to a further embodiment, the second providing entity includes an interlink entity for interlinking a number of reference ontologies by the provided semantic concept-instant relationships and/or by the identified relationship references.

According to a further embodiment, the assembling entity is configured to store, for each semantic object, a trichotomy of a semantic object key, a semantic object value and a semantic object relationship.

According to a further embodiment, the assembling entity is configured to store, for each semantic object, a semantic object identification, a semantic object key, a semantic object value, a semantic object relationship, a semantic object reference, a semantic object type, a semantic object probability, a data object identification, and a frame identification.

The following five tables may illustrate the operation of the present data unification device.

TABLE 1

| Data Object ID | Data Object Key | Data Object Value | Data Object Repository |
|---|---|---|---|
| 12983 | Paris-History | Paris was founded around the end of the 3rd century BC by the Gauls who were called Parisii. In 52 BC Julius Caesar's legions conquered the territory, founding the Roman city, Lutetia on the earlier settlement. | KB1 |

In Table 1, an unstructured data object taken from an unstructured knowledge base is depicted. The unstructured data object includes a data object ID, data object key, a data object value and a data object repository.

TABLE 2

| Data Object ID | Data Object Key | Data Object Value | Data Object Repository |
|---|---|---|---|
| 34456 | City_DB | Paris | KB2 |
| 34457 | Country_DB | France | KB2 |

In Table 2, two structured data objects taken from a structured knowledge base are depicted. Table 2 has four columns, namely one for data object ID, one for data object key, one for data object value and one for data object repository.

TABLE 3

| Frame ID | Object Key | Object Value | Object Relationship | Object References | Object Type | Data Object ID | Data Object Repository |
|---|---|---|---|---|---|---|---|
| 2 | Paris-History | Paris was founded around the end of the 3rd century BC by the Gauls who were called Parisii. | has Context | Text | Sentence | 12983 | KB1 |
| 2 | City | Paris | has Value | Structure | Triple | 34456 | KB2 |

Table 3 depicts two syntactic frames generated from the data objects of Table 1 and Table 2.

TABLE 4

| Frame ID | Object Key | Object Value | Object Relationship | Object References | Object Type | Data Object ID | Data Object Repository |
|---|---|---|---|---|---|---|---|
| 1 | Paris | <http://dbpedia.org/page/Paris> | owl:sameAsof | <http://dbpedia.org> | Triple | 34456 | KB2 |
| 2 | Paris | <http://dbpedia.org/page/France> | dbpedia-owl:isCityOf | <http://dbpedia.org> | Triple | 34456 | KB2 |
| 3 | France | <http://dbpedia.org/page/Paris> | dbpedia-owl:capitalof | <http://dbpedia.org> | Triple | 34457 | KB2 |

Table 4 depicts three semantic frames generated from the unstructured data object of Table 1 and the structured data objects of Table 2.

TABLE 5

| Semantic Object ID | Semantic Object Key | Semantic Object Value | Semantic Object Relationship | Semantic Object References | Semantic Object Type | Semantic Object Probability | Data Object ID | Frame ID | Data Object Repository |
|---|---|---|---|---|---|---|---|---|---|
| 1 | Paris-History | Paris was founded around the end of the 3rd century BC by the Gauls who were called Parisii. | hasContext | Text | Sentence | 1.0 | 12983 | 2 | KB1 |
| 2 | Paris | <http://dbpedia.org/page/Paris> | owl:sameAsof | <http://dbpedia.org> | Triple | 0.9 | 34456 | 4 | KB2 |

In Table 5, a list of two semantic objects is depicted. The two semantic objects of Table 5 are generated on the basis of the syntactic frame of Table 3 and the semantic frame of Table 4.

Any embodiment of the first aspect may be combined with any embodiment of the first aspect to obtain another embodiment of the first aspect.

According to a second aspect, a system is suggested that includes a data unification device according to above first aspect and a unified data access device for providing access to the semantic objects of the data unification device by a number of different access mechanisms.

According to a third aspect, a method for unifying unstructured data objects and structured data objects into unified semantic objects is suggested.

In one act, unstructured data objects from a number of unstructured knowledge bases and structured data objects from a number of structured knowledge bases are retrieved.

In an additional act, a number of syntactic frames for each retrieved data object are provided, wherein each of the syntactic frames includes a syntactic concept, a syntactic concept-instance, and a syntactic concept-instance relationship.

In an additional act, a number of semantic frames for each retrieved data object are provided, wherein each of the semantic frames includes a semantic concept, a semantic concept-instance, and a semantic concept-instance relationship.

In an additional act, for each retrieved data object, the provided syntactic frames and the provided semantic frames are assembled to one semantic object.

According to a fourth aspect, a computer program product is suggested that has a program code for executing the above discussed method for unifying unstructured data objects and structured data objects into unified semantic objects when run on at least one computer.

A computer program product may be embodied as a memory card, USB stick, CD-ROM, DVD or as a file that may be downloaded from a server in a network. For example, this may be provided by transferring the respective file with the computer program product from a wireless communication network.

BRIEF DESCRIPTION OF THE DRAWINGS

FIG. 5 depicts a schematic block diagram of an embodiment of a system including a data unification device, a unified data access device and a natural language question-answering device; and FIG. 6 depicts an embodiment of a sequence of acts for unifying unstructured data objects and structured data objects into unified semantic objects.

In the Figures, like reference numerals designate like or functionally equivalent elements, unless otherwise indicated.

DETAILED DESCRIPTION

Figure 1:
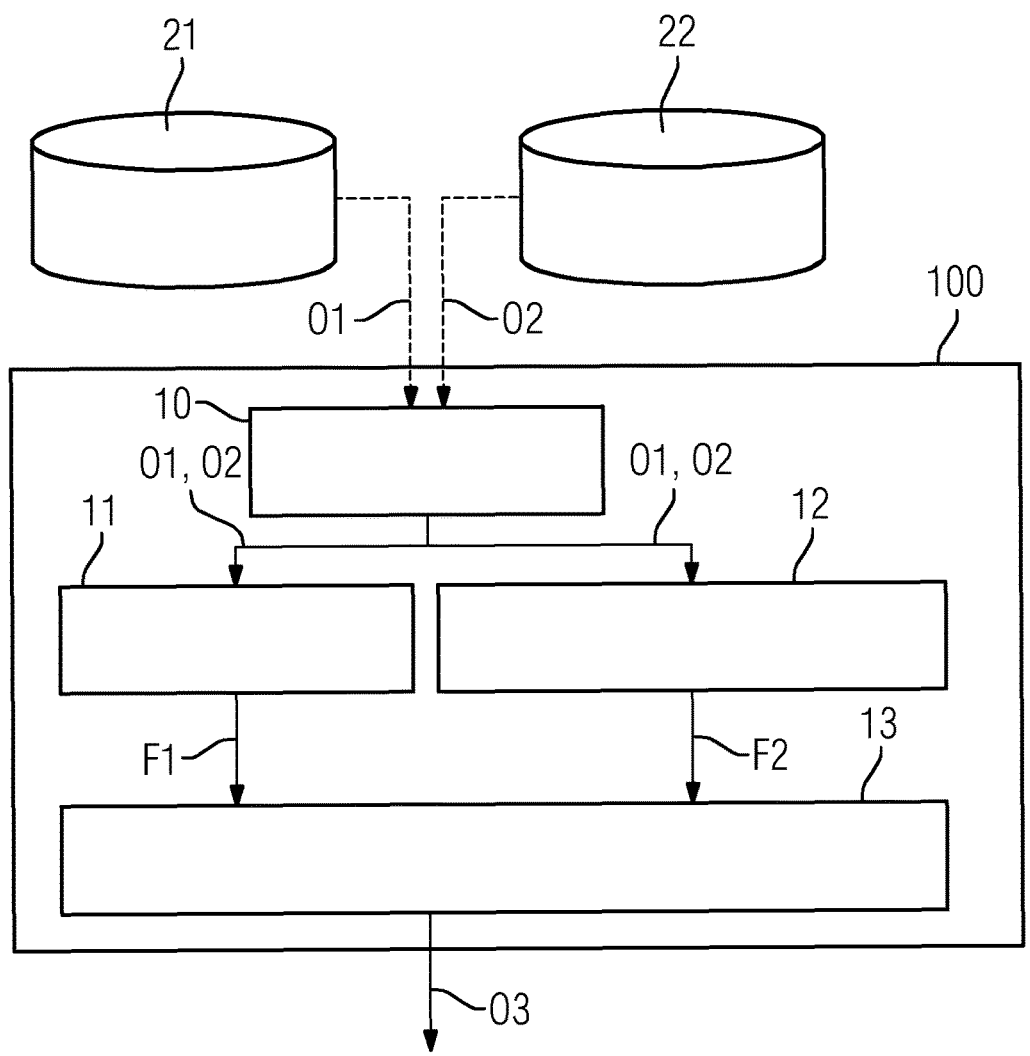
FIG. 1 depicts a schematic block diagram of a first embodiment of a data unification device.

In FIG. 1, a schematic block diagram of a first embodiment of a data unification device 100 for unifying unstructured data objects O1 and structured data objects O2 into unified semantic objects O3 is depicted.

The data unification device 100 of FIG. 1 includes a retrieving entity 10, a first providing entity 11, a second providing entity 12, and an assembling entity 13. The retrieving entity 12 is coupleable to a number of unstructured knowledge bases 21 and a number of structured knowledge bases 22. Without loss of generality, FIG. 1 depicts one unstructured knowledge base 21 and one structured knowledge base 22.

The retrieving entity 10 is configured to retrieve unstructured data objects O1 from the unstructured knowledge base 21. Further, the retrieving entity 10 is configured to retrieve structured data objects O2 from the structured knowledge base 22. For example, the retrieving entity 10 is embodied as a dispatcher. The dispatcher 10 may be configured to access different unstructured and structured knowledge bases 21, 22. Thus, the dispatcher 10 may access knowledge bases of any kind.

Moreover, the dispatcher 10 may be configured to pass, to request, to query, and to download unstructured data objects O1 and structured data objects O2 from the different unstructured and structured knowledge bases 21, 22.

The first providing entity 11 and the second providing entity 12 are arranged in parallel between the retrieving entity 10 and the assembling entity 13.

Figure 2:
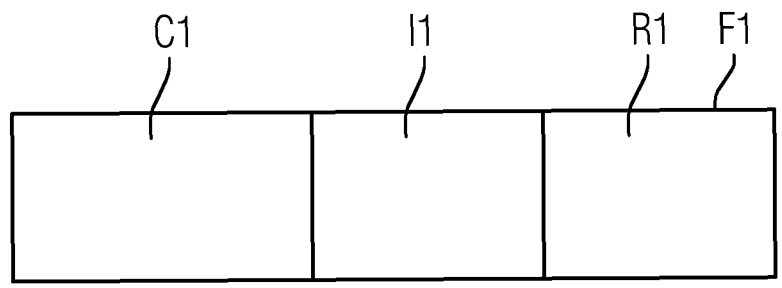
FIG. 2 depicts a schematic block diagram of an embodiment of a syntactic frame.

The first providing entity 11 is configured to provide syntactic frames F1 for each retrieved data object O1, O2. In other words, the first providing entity 11 may provide syntactic frames F1 for unstructured data objects O1 and also for structured data objects O2. Each of the syntactic frames F1 includes a syntactic concept C1, a syntactic concept-instance I1, and a syntactic concept-instance relationship R1 (see FIG. 2).

In particular, the first providing entity 11 is configured to extract linguistic-based information from each of the retrieved data objects O1, O2 by applying at least one of the following pre-processing algorithms: document structure detection, sentence boundary detection, tokenization, named entity recognition, linguistic parsing, data sourcing as well as routing and language detection.

Exemplarily, the first providing entity 11 may extract single pages, paragraphs, sentences, phrases, multi-words, and/or tokens from each of the retrieved data objects O1, O2 into one syntactic frame F1.

Figure 3:
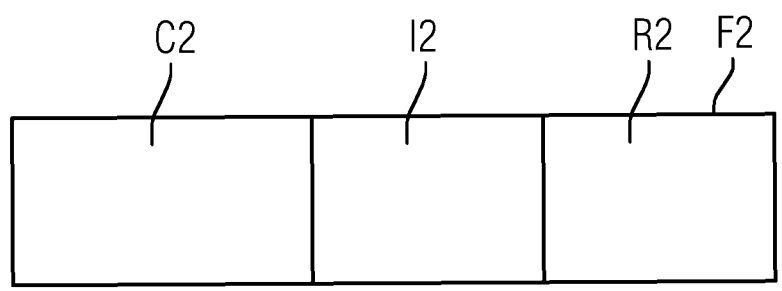
FIG. 3 depicts a schematic block diagram of an embodiment of a semantic frame.

Furthermore, the second providing entity 12 arranged in parallel to the first providing entity 11 is configured to provide a number of semantic frames F2 for each of the retrieved data objects O1, O2. Each of the semantic frames F2 includes a semantic concept C2, semantic concept-instance I2, and a semantic concept-instant relationship R2 (see FIG. 3).

For example, the second providing entity 12 may identify semantic information from each of the retrieved data objects O1, O2 by applying at least one of the following algorithms: knowledge base concept references, semantic concept references, syntax relationship references, and degree of probability. Particularly, the second providing entity 12 may identify unique resource identifiers and relationship references from each of the retrieved data objects O1, O2.

Finally, the assembling entity 13 is configured to assemble, for each of the retrieved data objects O1, O2, the syntactic frames F1 provided by the first providing entity 11 and the semantic frames F2 provided by the second providing entity 12 to one semantic object O3. The semantic objects O3 are unified and therefore not dependent on the data format of the unstructured knowledge bases 21 and structured knowledge bases 22. In particular, the assembling entity 13 may store, for each semantic object O3, a trichotomy of a semantic object key, a semantic object value, and a semantic object relationship.

Moreover, the assembling entity 13 may be configured to store, for each semantic object O3, a semantic object identification (ID), a semantic object key, a semantic object value, a semantic object relationship, a semantic object reference, a semantic object type, a semantic object probability, a data object identification (ID) and a frame identification (ID).

Figure 4:
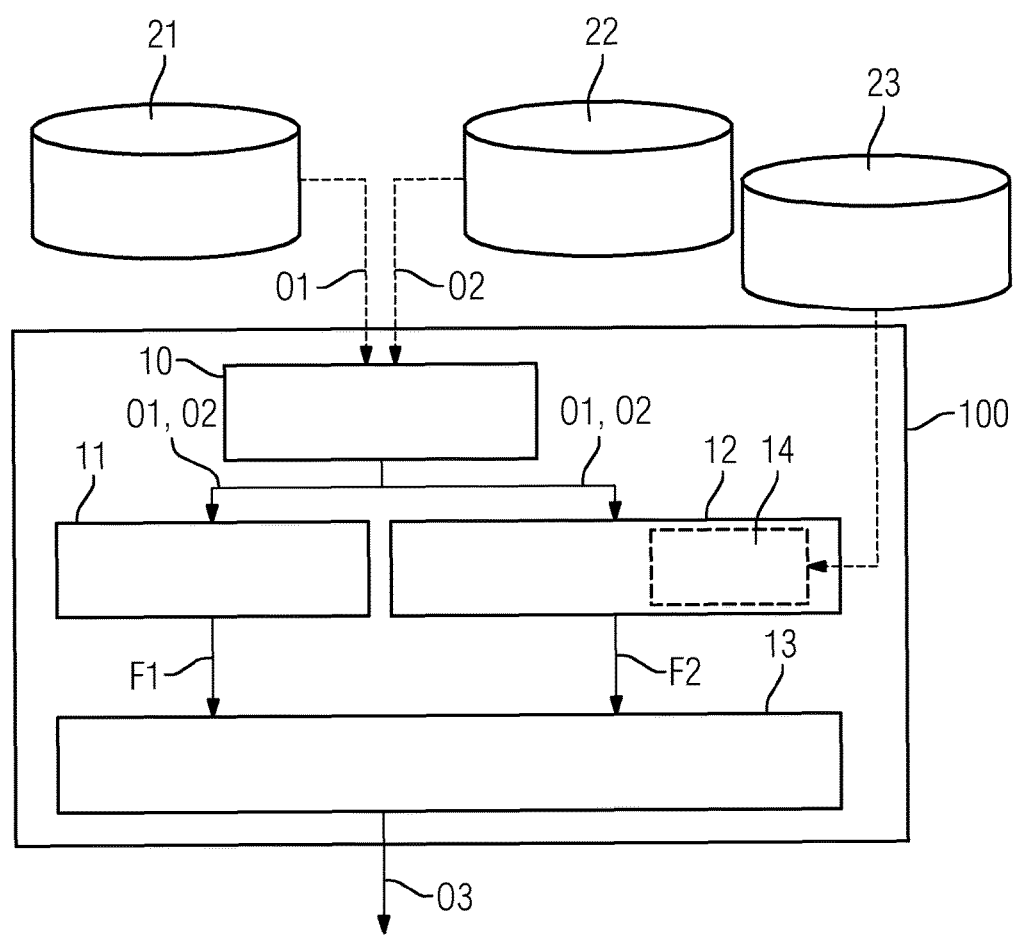
FIG. 4 depicts a schematic block diagram of a second embodiment of a data unification device.

FIG. 4 depicts a second embodiment of a data unification device 100 for unifying unstructured data objects O1 and structured data objects O2 into unified semantic objects O3. The device 100 of FIG. 4 includes all features of the device 100 of FIG. 1 and an interlink entity 14 additionally. In the example of FIG. 4, the interlink entity 14 is integrated in the second providing entity 12. The interlink entity 14 is configured to interlink a number of reference ontologies 23 by the provided semantic concept-instance relationships R1, R2 and/or by identified relationship references. Without loss of generality, FIG. 4 depicts one reference ontology 23.

In FIG. 5, a system is depicted that includes a data unification device 100, a unified data access device 200 and a natural language question-answering device 100. The device 100 of FIG. 5 is embodied as the device 100 of FIG. 4. Alternatively, the device 100 of FIG. 5 may be embodied as the device 100 of FIG. 1.

The unified data access device 200 is configured to provide access to the semantic objects O3 of the data unification device 100 by a number of different access mechanisms.

For example, the natural language question-answering device 300 may access the semantic objects O3 of the data unification device 100 and may therefore use the in-between layer, namely the unified data access device 200. The natural language question-answering device 300 may be configured to automatically answer a natural language question using a number of selected knowledge bases. The natural language question-answering device may be embodied as in International Patent Application PCT/EP2014/053862 with the title "Device and method for answering a natural language question using a number of selected knowledge bases." The natural language question-answering device 300 may include a candidate search entity, a hypothesis generation entity, a hypothesis ranking entity, and a knowledge base routing entity. The candidate search may, for example, use information as provided in the unstructured data basis 21 and the structured data basis 22. For this purpose, it may be beneficial that the candidate search entity of the natural language question-answering device 300 may have the possibility to use the unified semantic objects O3. To provide these unified semantic objects O3, the data unification device 100 is used. Moreover, the unified data access device 200 is used to access the data unification device 100.

FIG. 6 depicts an embodiment of a sequence of acts for unifying unstructured data objects O1 and structured data objects O2 into unified semantic objects O3. The method of FIG. 6 includes the following acts 601-604.

In act 601, unstructured data objects O1 from a number of unstructured knowledge bases and structured data objects O2 from a number of structured knowledge bases are retrieved.

In act 602, a number of syntactic frames F1 for each retrieved data object O1, O2 are provided, wherein each of the syntactic frames F1 includes a syntactic concept C1, a syntactic concept-instance I1, and a syntactic concept-instance relationship R1.

In act 603, a number of semantic frames F2 for each retrieved data object O1, O2 are provided, wherein each of the semantic frames F2 includes a semantic concept C2, a semantic concept-instance I2, and a semantic concept-instance relationship R2.

In act 604, for each retrieved data object O1, O2, the provided syntactic frames F1 and the provided semantic frames F2 are assembled to one semantic object O3.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A data unification device for unifying unstructured data objects and structured data objects into unified semantic objects, the device comprising:
   a retrieving entity configured to retrieve unstructured data objects from a number of unstructured knowledge bases and structured data objects from a number of structured knowledge bases;
   a first providing entity configured to provide a number of syntactic frames for each retrieved data object, wherein each syntactic frame of the first providing entity comprises a syntactic concept, a syntactic concept-instance, and a syntactic concept-instance relationship;
   a second providing entity configured to provide a number of semantic frames for each retrieved data object, wherein each semantic frame of the second providing entity comprises a semantic concept, a semantic concept-instance, and a semantic concept-instance relationship; and
   an assembling entity configured to assemble, for each retrieved data object, the provided syntactic frames of the first providing entity and the provided semantic frames of the second providing entity into a single unified semantic object,
   wherein the assembling entity is configured to store each unified semantic object, therein providing unified data access for the retrieved data objects.

2. The device of claim 1, wherein the first providing entity, the second providing entity, and the assembling entity are configured to virtualize the unstructured data objects and the structured data objects by the assembled unified semantic objects.

3. The device of claim 1, wherein the retrieving entity is embodied as a dispatcher configured to access different unstructured and structured knowledge bases.

4. The device of claim 3, wherein the dispatcher is configured to perform one or more of the following: parse, request, query, or download data objects from the different unstructured and structured knowledge bases.

5. The device of claim 1, wherein the first providing entity and the second providing entity are arranged in parallel between the retrieving entity and the assembling entity.

6. The device of claim 1, wherein the first providing entity is configured to extract linguistic-based information from each retrieved data object of the retrieved data objects by applying at least one of the following pre-processing algorithms: document structure detection, sentence boundary detection, tokenization, named entity recognition, linguistic parsing, data sourcing and routing, or language detection.

7. The device of claim 6, wherein the first providing entity is configured to extract one or more of single pages, paragraphs, sentences, phrases, multi-words, or tokens from each retrieved data object of the retrieved data objects into a syntactic frame.

8. The device of claim 1, wherein the second providing entity is configured to identify semantic information from each retrieved data object of the retrieved data objects by applying at least one of the following algorithms: knowledge base concept references, semantic concept references, syntax relationship references, or degree of probability.

9. The device of claim 8, wherein the second providing entity is configured to identify unique resource identifiers and relationship references from each retrieved data object of the retrieved data objects.

10. The device of claim 9, wherein the second providing entity comprises an interlink entity for interlinking a number of reference ontologies by the provided semantic concept-instant relationships, by the identified relationship references, or by the provided semantic concept-instant relationships and the identified relationship references.

11. The device of claim 1, wherein the assembling entity is configured to store, for each unified semantic object, a trichotomy of a semantic object key, a semantic object value, and a semantic object relationship.

12. The device of claim 11, wherein the assembling entity is configured to store, for each unified semantic object, a semantic object identification, a semantic object key, a semantic object value, a semantic object relationship, a semantic object reference, a semantic object type, a semantic object probability, a data object identification, and a frame identification.

13. A system, comprising:
a data unification device comprising:
a retrieving entity configured to retrieve unstructured data objects from a number of unstructured knowledge bases and structured data objects from a number of structured knowledge bases;
a first providing entity configured to provide a number of syntactic frames for each retrieved data object, wherein each syntactic frame of the first providing entity comprises a syntactic concept, a syntactic concept-instance, and a syntactic concept-instance relationship;
a second providing entity configured to provide a number of semantic frames for each retrieved data object, wherein each semantic frame of the second providing entity comprises a semantic concept, a semantic concept-instance, and a semantic concept-instance relationship; and an assembling entity configured to assemble, for each retrieved data object, the provided syntactic frames of the first providing entity and the provided semantic frames of the second providing entity into a single unified semantic object, wherein the assembling entity is configured to store each unified semantic object, therein providing unified data access for the retrieved data objects; and
a unified data access device for providing access to the unified semantic objects of the data unification device by a number of different access mechanisms.

14. A method for unifying unstructured data objects and structured data objects into unified semantic objects, the method comprising:
retrieving, by a retrieving entity of a data unification device, unstructured data objects from a number of unstructured knowledge bases and structured data objects from a number of structured knowledge bases;
providing, from a first providing entity of the data unification device, a number of syntactic frames for each retrieved data object, wherein each semantic frame of the first providing entity comprises a syntactic concept, a syntactic concept-instance and a syntactic concept-instance relationship;
providing, from a second providing entity of the data unification device, a number of semantic frames for each retrieved data object, wherein each semantic frame of the second providing entity comprises a semantic concept, a semantic concept-instance, and a semantic concept-instance relationship;
assembling, by an assembling entity of the data unification device, for each retrieved data object, the provided syntactic frames and the provided semantic frames into a single unified semantic object; and
storing, within the assembling entity of the data unification device, each unified semantic object, therein providing unified data access for the retrieved data objects.

15. A computer program comprising a program code configured to execute the following when run on at least one computer:
retrieve unstructured data objects from a number of unstructured knowledge bases and structured data objects from a number of structured knowledge bases;
receive, from a first providing entity, a number of syntactic frames for each retrieved data object, wherein each semantic frame of the first providing entity comprises a syntactic concept, a syntactic concept-instance and a syntactic concept-instance relationship;
receive, from a second providing entity, a number of semantic frames for each retrieved data object, wherein each semantic frame of the second providing entity comprises a semantic concept, a semantic concept-instance, and a semantic concept-instance relationship;
assemble, for each retrieved data object, the provided syntactic frames and the provided semantic frames into a single unified semantic object; and
store each unified semantic object, therein providing unified data access for the retrieved data objects.

* * * * *